C. A. SMITH.
ROAD BUILDING APPARATUS.
APPLICATION FILED JUNE 9, 1920.
1,422,895.
Patented July 18, 1922.
2 SHEETS—SHEET 2.
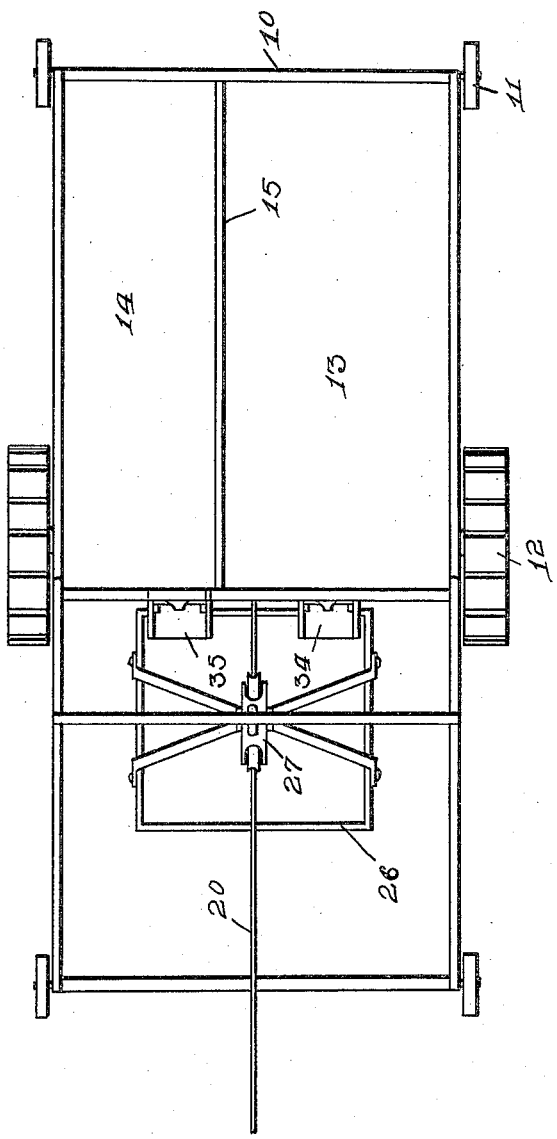
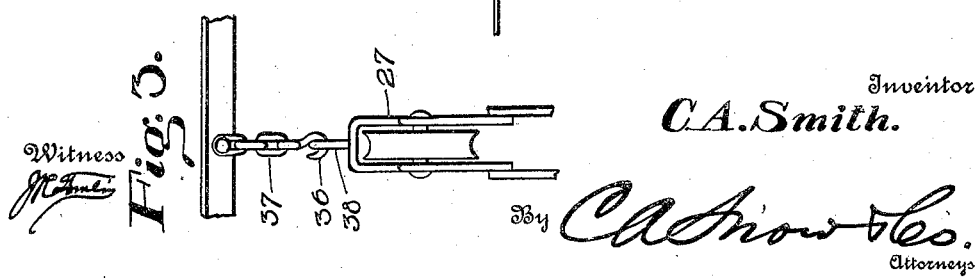

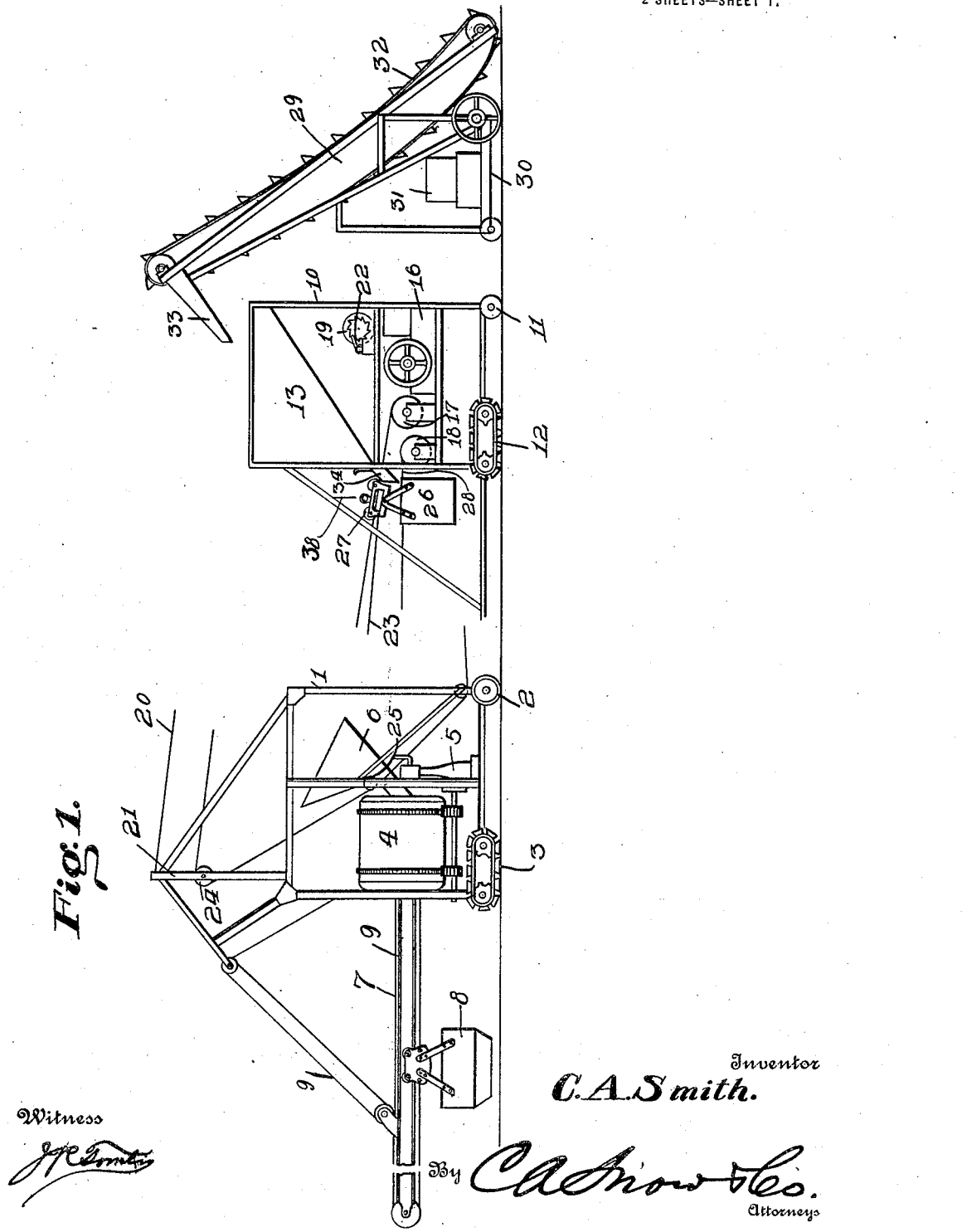

UNITED STATES PATENT OFFICE.

CARL A. SMITH, OF DEFIANCE, OHIO.

ROAD-BUILDING APPARATUS.

1,422,895.   Specification of Letters Patent.   Patented July 18, 1922.

Application filed June 9, 1920. Serial No. 387,648.

*To all whom it may concern:*

Be it known that I, CARL A. SMITH, a citizen of the United States, residing at Defiance, in the county of Defiance and State of Ohio, have invented a new and useful Road-Building Apparatus, of which the following is a specification.

This invention relates to apparatus for use in building concrete roads, one of the objects being to provide a novel arrangement of feeding, mixing and delivering mechanisms whereby material can be dumped along the prepared roadway and the various parts of the apparatus can be moved relative to each other at predetermined times for the purpose of supplying the mixing mechanism with the materials in proper proportions and then delivering the mixed ingredients to the distributing mechanism.

A further object is to provide mechanism of this character which reduces to the minimum the amount of handling of material necessary during the construction of a road surface, thereby materially reducing the cost of construction.

Another object is to provide apparatus utilizing storage bins, it being possible to vary the distance between the bins and the mixer so that the storage bins can be moved to the points of loading without necessarily shifting the position of the mixer.

With the foregoing and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings the preferred form of the invention has been shown.

In said drawings

Figure 1 is a side elevation of the complete apparatus, parts being broken away.

Figure 2 is a plan view of the storage bins and the conveying bucket adjacent thereto.

Figure 3 is a detail view of the bucket holding means.

Referring to the figures by characters of reference 1 designates a frame preferably supported by wheels 2 and caterpillar treads 3 or in any other suitable manner, this frame carrying the usual mixing drum 4 adapted to be driven by a motor indicated generally at 5. A feed hopper 6 opens into the mixer and the structure 1 extends a sufficient distance above this hopper to provide clearance for a bucket used for delivering material to the hopper. The mixer may be formed with the usual sweep arm 7 carrying a movably supported delivering bucket 8 and the usual or any preferred arrangement of cables 9 can be employed for operating the sweep and the bucket 8 respectively.

A storage clamp is adapted to be used in connection with the mixing mechanism and includes a structure 10 mounted on supporting wheels 11 and caterpillar treads 12 or movably supported in any other manner desired. In this structure 10 are arranged two compartments or hoppers 13 and 14 respectively separated by a partition 15, the capacity of the larger or sand compartment or bin being preferably one-half of that of the stone bin 13. A hoisting engine indicated generally at 16 is mounted under the bins and is designed to operate a pair of drums indicated at 17 and 18. Another drum 19 is arranged under the bins and is adapted to be driven by the engine 16. A track or supporting cable 20 is secured at one end to a superstructure 21 on the structure 1 of the mixer and the other end of this supporting cable extends into the structure 10 and is secured to the drum 19, there being pawl and ratchet mechanism, indicated generally at 22, for preventing the cable 20 from unwinding from its drum 19.

Secured to the drum 17 is an operating cable 23 which extends over a guide sheave 24 carried by the superstructure 21 and thence downwardly into engagement with guide sheaves 25 and rearwardly to a bucket 26 to which the cable is attached. This bucket is suspended from a carriage 27 mounted to travel on the cable 20. Another cable 28 is secured to the bucket 26 and is attached to the drum 18.

A loader of the self feeding type has been indicated at 29 and includes a movably supported frame 30 supporting a motor 31 adapted to drive an endless bucket conveyor 32 the lowermost portion of which is adapted to come against a pile of sand or gravel and elevate the material to a delivering spout 33.

The storage bins hereinbefore referred to are provided with outlets in the bottoms of the respective compartments 13 and 14 at the front walls thereof and extending from each of these outlets is a delivering spout 34 and 35 respectively. Both of these spouts are adapted to discharge into the bucket 26 when brought to position below the bins of the mixer.

In using the mechanism herein described the road bed is first prepared to receive the concrete surface after which stone and sand are placed in piles along the roadway at convenient intervals, the piles being arranged so that the alternate ones will contain the same proportions as those specified to be used in the construction of the surface. The loader 29 is moved successively against these piles so as to direct the material into the bins. In practice these bins have a capacity of from four to eight or more cubic yards and of sufficient capacity to charge the mixer used for one complete movement. In other words it is intended to have enough materials stored in the bins to keep the mixer supplied until the finished pavement has reached such proportions as to necessitate the movement of the mixer to another position. The aggregates are delivered from the bins 13 and 14 through the outlet chutes or spouts 34, the outflow being controlled by an operator in any desired manner. The materials thus delivered are measured in the bucket 26 after which cement in desired proportions is added to the load in the bucket. After the bucket has been filled the drums 17 and 18 are set in motion so as to cause the bucket 26 to travel along the supporting cable 20 and empty into the hopper 6, this dumping operation taking place either automatically or by hand, as preferred, and depending on the construction of the bucket used, it being understood that a self dumping bucket can be employed if desired.

When it becomes necessary to move the mixer to another position the cable 20 is paid out so as to become slack but before this is done a hook 36 which is supported by a chain 37 or the like from the structure 10 is placed in engagement with an eye 38 on the carriage 27. Thus when the cable 20 becomes slack the bucket 26 will be properly supported. After sufficient slack has been produced in the cable 20 the bins are reloaded, said bins, as well as the loader or elevator 29 traveling during this operation from one pile of material to another. As soon as the bins have been charged the remaining slack in the cable 20 is taken up, the bucket 26 is recharged, and the mixing operation can then proceed as before.

What is claimed is:

Road building apparatus including movably supported mixing mechanism, a bin structure movable relative to the mixing mechanism to position for receiving materials to be mixed, a track cable connecting the bin structure to the mixing mechanism and adjustable in length so as to be substantially taut when the mixing mechanism and the bin structure are at any distances apart, a bucket movably supported by said cable, means for directing materials into the bucket from the bin structure, and means movable with the bin structure for shifting the bucket to convey material from the bin structure to the mixing mechanism, and means on the bin structure for engaging and supporting the bucket while the track cable is slack during the movement of the bin structure relative to the mixing mechanism.

In testimony that I claim the foregoing as my own, I have hereto affixed my signature in the presence of two witnesses.

CARL A. SMITH

Witnesses:
FERDINAND J. MAAG,
OTTO PETERS.